United States Patent Office 3,424,588
Patented Jan. 28, 1969

3,424,588
CHILLPROOFING FERMENTED BEVERAGES WITH POLYVINYL RESIN MODIFIED CLAYS
Eugene J. Dohman and William A. Rinehimer, Las Vegas, Nev., assignors to National Lead Company, New York, N.Y., a corporation of New Jersey
No Drawing. Filed June 2, 1964, Ser. No. 372,098
U.S. Cl. 99—48                      19 Claims
Int. Cl. C12h 1/04

---

ABSTRACT OF THE DISCLOSURE

Removal of proteinaceous complexes, tannins, and other elements which are harmful to flavor and clarity from beverages such as beer to "chillproof" the beverages by contacting the beverage with an inorganic clay such as hectorite modified with a polyvinyl resin such as a polyvinyl acetate or a poly N-vinyl pyrrolidone.

---

This invention relates to the selective adsorption of solute in fluids. More particularly it relates to the use of inorganic clays that have been modified with polyvinyl resins to absorb and separate solute from fluids.

In one aspect of the invention an inorganic clay, such as the swelling gelling montmorillonite clay hectorite, is modified through combination with a polyvinyl resin such as a water insoluble polyvinyl acetate resin. The modified hectorite is then used to chillproof the beer in conventional manner by dispersing the modified clay in the beer during the processing thereof. When the clay has performed its chillproofing action it is removed from the beer. During its residence in the beer the present type of modified clay acts in a manner similar to that of chillproofing clays now in present commercial use and adsorbs what are believed to be proteinaceous complexes, tannins, and other elements which are harmful to flavor and clarity of beer with the passage of time. These entities are removed along with the clay when the clay is removed from the beer. In addition to performing this conventional function the resin modified clay exhibits significantly retarded hydration by the beer and serves to prevent sludge formation.

Sludge formation by hydrated and swelled clays has been one of the more serious problems sought to be overcome in connection with the use of clays as a chillproofing agent. The problem is especially pronounced with gelling swelling clays. In the absence of a modification of the clay the hydrated and swelled clay entraps a substantial quantity of the beer. The entrapped beer is removed and lost with the clay and represents an undesirable economic loss. Thus the present use of resin modified clays overcomes a problem of serious commercial consequence.

The above aspect of the invention with respect to beer processing represents only one area of utility of the invention. In the broader aspects of the invention it is contemplated that polyvinyl resins in general in combination with inorganic clays in general will have utility for the separation of any clay adsorbable solute from a fluid containing the solute. The term "solute" is herein used in the broadest sense to include materials which dissolve to form true solutions in liquid fluids as well as those which form solutions through colloidal dispersions in the liquid fluids. In the case of gaseous fluids, the term solute used herein may refer to solutes which are in the solid phase, gas phase, or liquid phase.

Accordingly, the present invention may be defined as a method for removing clay adsorbable solute from a fluid comprising contacting the fluid containing the solute with a sufficient amount of a polyvinyl resin modified inorganic clay to absorb the solute, and then separating the clay and the fluid.

In the practice of such a method any inorganic clay may be used whether synthetic or naturally occurring so long as the clay has sufficiently high surface area and adsorptive capacity for the particular end use in mind. Thus, it is possible to use non-swelling clays such as kaolinite or attapulgite or other sub-bentonites. Similarly any of the swelling clays such as the bentonites and particularly the montmorillonites are suitable. The montmorillonite member hectorite is a preferred material. Natural and synthetic zeolites as well as talc, oxides and hydroxides of alkaline earth metals, and silica gels may be considered as equivalently useable pigment materials having the requisite surface area and adsorptive capacities necessary for the present invention.

The selected clay is used in combination with a polyvinyl resin. The polyvinyl resin prevents or inhibits hydration or solvent absorption by the clay. The resins thereby avoid loss of the product being clarified or filtered by the clay. The preferred resins also enhance the adsorptive or solute removal abilities of the clay while preventing hydration and fluid pick up by the clay.

Useful resins for purposes of combination with the clays that are to participate in the present method include polyvinyl resins, both homopolymers and copolymers, in general. The materials include all of those polymeric entities which are prepared by polymerization of at least one monoolefinic compound in the presence of a suitable free radical catalyst such as an organic peroxide. The group therefore encompasses a great number and variety of resins. Included are such resins as polyvinyl pyrrolidones represented by the formula:

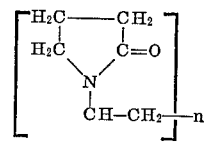

Resins of this type are commercially available in grades of molecular weights of about 40,000 to 360,000.

Another suitable group of polyvinyl resins are the polyvinyl alcohols. This type of material is prepared by controlled hydrolysis of homopolymers of vinyl esters or copolymers of one or more vinyl esters with monoolefinically unsaturated compounds such as acrylonitrile, vinyl chloride, vinylidene chloride, isobutylene and the like.

Other types of polymers in the useful category for present purposes are the homo and copolymers of amides of unsaturated carboxylic acids such as exemplified by homo and copolymers of acrylamide, methacrylamide, and N-substituted derivatives thereof.

Another group of suitable polymers is the homo and copolymers of vinyl ethers, particularly alkyl vinyl ethers such as methyl and ethyl vinyl ethers.

Another group of suitable polymers are those having recurring basic nitrogen containing groups along a continuous chain. Examples of these materials include polymers such as polyvinyl pyridine and other poly-N-vinyl-imines.

The most preferred group of resins for present purposes are the materials known as polyvinyl acetates and particularly the water insoluble polyvinyl acetates including both the homopolymers and copolymers thereof. As will be shown this type of material produces a modified clay which has increased adsorptive abilities. It yields a very much reduced sludge component especially when used in beer production. Typical useable water insoluble polyvinyl acetate resins which may be used for present purposes in combination with the inorganic clay include the following presently commercially available materials:

The polyvinyl resins offered by DuPont under the trademark Elvax 150 and Elvax 250. A typical analysis of the Elvax vinyl resins is as follows:

|  | "Elvax" 150 | "Elvax" 250 |
| --- | --- | --- |
| Inherent viscosity at 30° C. (0.25% by wt. in toluene) | 0.78 | 0.85 |
| Comonomer ratio ethylene, vinyl acetate, wt. percent | 67:33 | 71:29 |
| Melt index (ASTM D-1238-57T) | 25 | 15 |
| Odor | Slight | Slight |
| Tensil strength, p.s.i. | 1,000 | 2,000 |
| Elongation at break, percent | 700 | 750 |
| Density, g./cc. at 30° C. | 0.95 | 0.95 |
| Refractive index, $N_D{}^{25}$ | 1.485 | 1.482 |
| Softening point (ring and ball), ° F. | 253 | 276 |

Another group of suitable materials are the polyvinyl acetate homopolymers and copolymers provided by Shawinigan Resins Corporation and offered under the trademark Gelva. A typical suitable Gelva resin in the form of an aqueous emulsion is the resin termed TS-71 by the manufacturer and is a copolymer of polyvinyl acetate having the following properties:

TS-71

| | |
| --- | --- |
| Type | Copolymer dispersion. |
| Total solids (min.) | 54.5%. |
| Emulsion viscosity, cps. | 1000–1400. |
| pH | 4.5–5.5. |
| Molecular weight (number av.) | Low. |
| Particle size | Average about 0.5 microns. Most between 0.2–1.2 microns. |
| Residual monomer | Less than 0.75%. |
| Particle charge | Anionic. |
| Borax stability | Stable. |
| Solvent tolerance: | |
|    Alcohol | 95–105. |
|    Trichlorethylene | 20–55. |
|    Carbon Tetrachloride | 30–80. |
| Pounds per gallon, emulsion, 25° C. | 9.0. |
| Specific gravity, solids | 1.15. |
| Mechanical stability | Good. |
| Dilution stability | 1.0–2.0. |
| Freeze-thaw stability | Very Good. |
| Bond time, sec. | 60–70. |
| Wood shear bond strength, p.s.i. | 2600–3000. |
| Heat seal temp. of film, ° F. | 170–180. |

Another typical useful material is made by the Dow Chemical Company and is the polyvinyl acetate copolymer termed Devlex A515. This material is a copolymer providing 50% by weight vinyl acetate and 50% by weight N-vinyl-5-methyl-2-oxazolidinone. This material has the following properties:

| | |
| --- | --- |
| Form | White, free-flowing powder. |
| K-Value | K 15–5. |
| Unsaturation (as N-vinyl-5-methyl-2-oxazolidinone and vinyl acetate), percent | 0.47. |
| Nitrogen, percent | 5.48. |
| Ash, percent | 0.014. |
| Heavy metals (Cu, Pb, Zn) | 8 p.p.m. |
| Bulk density, lb./cu. ft. | 31.5. |
| Softening point, °C. | 115. |
| Melting range, °C. | 125–135. |

The most preferred material for use in the present invention is a polyvinyl acetate resin made by Air Reduction Chemical and Carbide Company and sold under the trademark Vinac ASB-10 although the other Vinac resins sold by this manufacturer could also be used. For example, Vinac 7 is suitable. This polyvinyl acetate resin has a softening point of about 105° C., an approximate molecular weight of 32,000, and a Brookfield viscosity in benzene in a solution containing 86 grams per 1,000 ml. of solution at 20° C. of 6.3–7.7 cps.

The preferred Vinac ASB-10 is a polyvinyl acetate resin that has been modified to impart solubility in alkaline systems. It has an approximate molecular weight of 42,000, a softening point of about 130–140° C., and a Brookfield viscosity of about 9–11 cps. in benzene containing 86 grams of resin per 1,000 ml. of solution at 20° C. and 11–13.5 cps. in a 9.53 weight percent solution in ethanol.

The resin is present in combination with the clay in an amount sufficient to achieve the desired result of hydration resistance and insolubility in the fluid containing the solute to be adsorbed. In general the resins will accomplish the purpose when present in an amount of about 1–30% by weight of the clay but will necessarily vary depending upon the resin and clay employed and the particular end use contemplated.

The modified resin containing clay may be made by any method which insures the uniform distribution of the polymer on the surface of the clay particles. Generally they will be prepared before use and then contacted with the fluid to be purified. However, it is possible to form the modified clay during use by separately contacting the fluid with the clay and resin and allowing the clay and resin to combine in the fluid being treated.

When prepared before use the polymer is suitably combined with the clay by blending the clay and polymer in a hammer or ball mill for example. Frequently a more uniform distribution of the resin and clay may be achieved by combining the clay and resin in a slurry or solution. In many cases an aqueous slurry will serve such a purpose. In other cases it may be desired to use a suitable organic solvent such as benzene or alcohol in which the resin may be dissolved followed by mixture of the dissolved resin with the clay. Before use the solvent is commonly removed.

Copending patent application, Ser. No. 372,092, filed June 2, 1964, now abandoned in favor of co-pending patent application, Ser. No. 681,111 filed Nov. 7, 1967 describes the preparation of the preferred water insoluble polyvinyl acetate inorganic clay combinations that are useful in the present method. Further preparative details can be found in said application.

In practicing the present method the modified clay is contacted with the fluid in a manner so as to adsorb the solute to be removed from the fluid. Any method of contact that will achieve the purpose is appropriately employed. Such procedures include the use of columns packed with the modified clay through which the fluid containing the solute can be flowed. Other procedures contemplate fluid contact through the use of filters made from the modified clay or with membranes made from the modified clay. Also contemplated is the physical dispersion of the modified clay in the fluid to be treated. For example it is presently common practice to disperse clay in either dry or slurried form in beer at a suitable point in the brewing process. These techniques are applicable to the presently modified clays.

With respect to amounts of modified clay to be used with the fluid under treatment, the modified clay is used in an amount necessary to adsorb the solute in the fluid. This will vary with the fluid and the solute content thereof as well as the adsorptive capacity of the modified clay. As a guide, and when using swelling gelling clays such as hectorite, it has been found that about 120 to 500 p.p.m. of clay to the beer fluid achieves satisfactory results. In addition to this quantity of clay, of course, there will be found about 1–30% by weight of resin to clay and preferably on the order of about 5% of resin by weight to the clay. The following examples will illustrate the highly successful results obtained when using the resin modified clays in accordance with the present process.

Example I

This example illustrates the significant sludge reduction obtained with resin modified clays in beer production. The following materials were dispersed in beer so as to constitute 200 parts per million of clay in the beer. The resin modified clay was prepared prior to use and was made up so as to constitute 5% by weight of resin to the weight of the clay. Following treatment of the beer, measurement of sludge produced by the clays yielded the following observed values:

| | Sludge in inches | | | Percent total volume on last observed day |
|---|---|---|---|---|
| | Initial reading | One day later | Four days later | |
| Hectorite | 1¾ | 1½ | 1⅜ | 11.0 |
| Hectorite and Vinac ASB-10 | ⅝ | ⅝ | ⅝ | 5.3 |

It is noted that hectorite modified with the preferred water insoluble polyvinyl acetate resin Vinac ASB-10 resulted in a surprisingly low sludge volume as compared with the unmodified hectorite. While resulting in the lower sludge volume, the adsorptive ability of the hectorite as a chill-proofing agent is not impaired. This is illustrated in the next example in terms of haze reading in the finished beer product.

Example II

Various polyvinyl acetate resins were combined with purified hectorite so as to constitute 25% by weight of the hectorite. This material, as well as an unmodified hectorite control material, was then used to chill-proof beer which was prepared and processed in conventional manner. A control quantity of beer containing no clay additives at all was also processed.

The clays were added at the usual time to the beer. Contact time of the clays with the beer was 48 hours. The filtration medium used in the beer process prior to the clay addition was a 3.0 micron Millipore filter. Conditioning treatment of the beer consisted of heating to 53° C. and cooling, and agitation by 360° rotation for approximately 15 hours. 16 parts per million of $SO_2$ was also added to the beer after filtration.

In all cases 200 parts per million of the hectorite clay was added to the beer. In those cases in which the clay was modified with resin, 200 parts of the clay was added plus the 25% by weight of the resin making a total modified clay addition of 250 parts per million.

The beer was agitated during contact with the clay in one set of trials. All of the trials were repeated where no agitation was utilized during the contact period. No enzymes were added to the beer in any of the trials.

The following haze readings were obtained on 7 oz. bottles. The readings were made with a radiometer.

| Material used | Chill Haze | | | | |
|---|---|---|---|---|---|
| | Agitation | Ambient haze | 36 hrs. | 50 hrs. | Glass reading |
| None | No | 84 | 426 | 400 | 328 |
| Do | Yes | 84 | 296 | 360 | 259 |
| Hectorite control | No | 82 | 284 | 320 | 260 |
| Do | Yes | 83 | 208 | 220 | 208 |
| Elvax 150 modified hectorite | No | 87 | 262 | 270 | 250 |
| Do | Yes | 92 | 218 | 222 | 193 |
| Polyvinyl pyrrolidone modified hectorite | No | 79 | 179 | 188 | 163 |
| Do | Yes | 79 | 110 | 118 | 116 |
| Devlex 515A modified hectorite | No | 133 | 347 | 370 | 270 |
| Do | Yes | 151 | 326 | 328 | 284 |

Example III

This example illustrates the improved adsorption properties of the polyvinyl resin modified clays as compared with unmodified clay. It also illustrates solute removal from a gaseous fluid.

Beer which had not been previously treated with clay was vaporized and passed through a column packed with hectorite. Similarly beer vapor was passed through other columns packed with three different resin modified hectorites. Aldehyde development with pararosanaline was determined on the distillate using a Kett-Sumerson colorimeter. The makeup of the clays as to quantities was the same as Example I and contained 5% by weight resin to clay. The following colorimeter readings were observed:

Clay: Colorimeter reading
Hectorite _____ 40.3
Hectorite and Vinac ASB-10 _____ 31.9
Hectorite and polyvinyl alcohol resin _____ 37.8
Hectorite and methylvinyl ether resin _____ 34.0

The differences represented by the above colorimeter readings were easily observable by the naked eye.

Following the above vapor phase adsorption the four clay adsorbents were slurried in distilled water and pararosaniline dye added to each of the clays. A marked difference in color was apparent to the naked eye between each of the four clays. The hectorite Vinac ASB-10 modified clay showed the strongest color.

The modification of the clay with a polyvinyl resin serves to convert the clay into a physical form suitable for adsorption activity in various fluids. The adsorption is made possible using a wide variety of mechanisms and equipment for carrying out the function. For example, the modification of the clay enables the clay to be conveniently packed in a column so that the fluid can be flowed through the column. This has significant practical advantages over the necessity of having to disburse the unmodified clays into the fluid being treated followed by a separation of the clay from the fluid.

In the area of beer treatment, the use of resin modified clay has a number of advantages over the known use of certain resins by themselves including the avoidance of bad taste and chunks of resin in the beer. These latter noted undesirable problems have been observed where resin such as polyvinyl pyrrolidone has been used by itself in the treatment of beer. Finally, the use of polyvinyl resin modified clay in the area of beer treatment is advantageous over the use of the clay alone in that better chillproofing without the necessity of enzymes can be achieved.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for removing clay adsorbable proteinaceous complexes, tannins and other elements harmful to flavor and clarity, from a fermented beverage fluid such as beer comprising contacting the fluid with a sufficient amount of a polyvinyl resin modified inorganic clay to adsorb the same, said resin comprising about 1–30% by weight of said clay, and then separating the clay and the fluid.

2. A method in accordance with claim 1 wherein said fluid is in the form of vapor.

3. A method in accordance with claim 1 wherein said fluid is a liquid.

4. A method in accordance with claim 1 wherein the contact between the fluid and the clay is executed by passing the fluid through a column packed with said modified clay.

5. A method in accordance with claim 1 wherein said contact between the fluid and the clay is executed by passing the fluid through a filter containing said modified clay.

6. A method in accordance with claim 1 wherein said resin is a water insoluble polyvinyl acetate resin and said clay is a gelling swelling inorganic clay.

7. A method in accordance with claim 6 wherein said resin is a homopolymer of vinyl acetate.

8. A method in accordance with claim 6 wherein said resin is a copolymer of vinyl acetate.

9. A method in accordance with claim 1 wherein said resin is a polyvinyl alcohol resin.

10. A method is accordance with claim 1 wherein said resin is a polyvinyl ether resin.

11. In the process for brewing beer including the step of contacting the beer with an inorganic clay to chill-proof the beer, the improvement which comprises chill-proofing the beer with a polyvinyl resin modified inorganic clay composition in which the resin constitutes about 1–30% of the clay.

12. The improved process in accordance with claim 11 wherein said resin is a water insoluble polyvinyl acetate resin and said clay is a gelling swelling inorganic clay.

13. The improved process in accordance with claim 11 wherein the beer is chillproofed with hectorite modified with about 5% by weight with respect to the clay of a water insoluble polyvinyl acetate resin, said resin being modified to impart solubility in alkaline systems, having an approximate molecular weight of 42,000, a softening point of about 130–140° C., and a Brookfield viscosity of about 9–11 cps. in a benzene solution containing 86 grams of resin per 1,000 ml. of solution at 20° C. and 11–13.5 cps. in a 9.53 weight percent solution in ethanol.

14. An improved chill-proofing method for beer which comprises contacting the beer with an effective amount of a water insoluble polyvinyl acetate resin modified gelling swelling clay after fermentation to adsorb entitles harmful to flavor and clarity, said resin comprising about 1–30% by weight of said clay, then separating the modified clay and the beer, and completing the beer making process.

15. An improved chillproofing method in accordance with claim 14 wherein the clay is contacted with the beer by mixing an aqueous slurry of the modified clay with the beer.

16. An improved chillproofing method in accordance with claim 14 wherein said clay is contacted with the beer by dispersing the modified clay in dry form in the beer.

17. An improved chillproofing method in accordance with claim 14 wherein the clay is contacted with the beer in an amount of about 120 to 500 parts per million of the beer and the resin combined with the clay constitutes aboot 1 to 30% by weight of the clay.

18. An improved chillproofing method in accordance with claim 14 wherein the clay is hectorite, the hectorite is contacted with the beer in an amount of about 200 parts per million of the beer, and the resin combined with the clay constitutes about 5% by weight of the clay.

19. A method in accordance with claim 1 wherein said resin is a poly N-vinyl pyrrolidone.

References Cited

UNITED STATES PATENTS

| | | | |
|---|---|---|---|
| 2,947,633 | 8/1960 | Perry et al. | 99—48 |
| 3,163,537 | 12/1964 | McAdam et al. | 99—48 |

A. LOUIS MONACELL, *Primary Examiner.*

D. M. NAFF, *Assistant Examiner.*